Patented Sept. 28, 1926.

1,601,027

UNITED STATES PATENT OFFICE.

EUGENE HENRY LEFEVRE, OF BARTOW, AND SETH STETSON WALKER, OF TAMPA, FLORIDA, ASSIGNORS, BY MESNE ASSIGNMENTS, TO AVON CANNING COMPANY, OF TAMPA, FLORIDA, A CORPORATION OF FLORIDA.

PROCESS FOR PREPARING FRUIT FOR CANNING

No Drawing. Application filed April 23, 1923. Serial No. 634,150.

This invention relates to processes for preparing fruit for canning, and more particularly to the preparation of grapefruit for this purpose. An object thereof is to provide a simple, continuous and efficient process whereby whole fruit-sections of grapefruit, with seeds and membranous integument removed, may be made ready for subsequent packing and "processing" in suitable containers. Other objects will be in part obvious and in part pointed out hereinafter.

This invention accordingly consists in the novel steps or operations, and the combinations of such steps or operations, herein described and more particularly pointed out in the claims.

The salient features of this invention may be best understood by here emphasizing the fact that the present process renders it commercially practically to can grapefruit-sections, separated one from another, unbroken and uncut, with substantially all pith, enveloping membrane and seeds removed. Because of the tender nature of cellular tissue of the juice-sacks it has heretofore been generally the practive to cut or slice grapefruit in preparing it for canning.

As it is desirable that only sound fruit of uniform size be used in each run of fruit through the cannery, the grapefruit as it arrives is first washed, graded and sized, any of the standard packing house machines designed for this purpose being used. The selected fruit is then scalded, immersing in a hot liquid, preferably water, or by spraying with hot liquid or steam, in fact by any of the usual methods, and by the use of any of the various forms of apparatus ordinarily employed for scalding or "blanching" fruits and vegetables. The object of the scalding operation is to loosen the thick outer peel so that it may be stripped off more easily.

The peel is then removed by "scoring" (that is, by making two meridional cuts through the peel, approximately at right angles to each other) and stripping off the quarter-sections of peel. Any pith left adhering to the fruit is removed by means of a knife, thumb-nail or other instrument, so as to leave the fruit substantially free from all covering except the thin inner membrane which envelopes each fruit-section. The circumferential portions of the said membrane are next disintegrated by the application of a hot lye solution, either by submersion or spraying. Preferably the fruit is immersed for a suitable length of time in a soda-lye solution, of predetermined strength, and at temperatures near to the boiling point. However potash-lye solutions may be used and the other conditions may be varied at will so long as efficient results are attained, in disintegrating the membrane without unduly softening, or in other ways adversely affecting the fruit. This operation may be carried out by dipping baskets of fruit into an open tank or by using one of the continuous lye-peeling machines which are on the market for peeling peaches, and other fruits and vegetables.

The fruit is next washed to cleanse it of all lye solution, and to remove any remaining particles of partially disintegrated membrane. A double result is here attained in one operation, for while the fruit is being washed its temperature is lowered. This second result is not generically peculiar to the present process, for it is desirable to cool many fruits quickly after they have been through the hot lye solution. But the present process does at this point differ specifically from the usual washing and cooling procedure. With reference to other fruits and vegetables it may be desirable to provide for immediate cooling in order that they may be discolored as little as possible; and to guard against loss in quality due to the cooking action of the hot lye solution. Therefore the result is satisfactorily accomplished when the cooling medium has approximately the normal room temperature. The present process, as stated above, has for its ultimate object the canning of grapefruit after each fruit has been reduced to separate fruit-sections, free from their enveloping membranes. Each of these fruit-sections is made up of a group of juice-sacks held together by a single membrane which completely envelops the group. It will be understood therefore that these sections are extremely tender and that even under normal conditions are easily torn unless handled with great care. As grapefruit, particularly when quite ripe, emerges from the lye it is often in a state bordering upon mushiness, and in order that it may, without great loss, be handled and made ready for canning as described, it is frequently necessary not merely to cool it but to bring its temperature down far below normal room temperature, preferably by means of water precooled by icing or otherwise. In practice, best results have been attained when the temperature of the cooling water has been kept below 40 degrees, Fahrenheit. By the present invention this is preferably done as follows: The fruit leaving the apparatus wherein it has been treated with lye, is passed through a spray of cool water, being suitably rubbed or agitated meanwhile, either mechanically or by hand, whence it moves into contact with the precooled water, which may be contained in one of the standard washing machines used in connection with lye peeling outfits.

After having been cooled to a condition of suitable solidity the fruit is next cored. The apparatus preferably used for this purpose is described in our copending application filed Feb. 26, 1923, Serial Number 621,319, in which a hollow coring tube of suitable diameter and having a sharp cutting edge is combined with a plunger, slidably contained within the tube and designed to force the core back into the fruit as the latter is withdrawn from the coring tube. It is desirable so to replace the core because of the tendency of the fruit to collapse and tear the fruit-sections while being conveyed to the operatives who perform the remaining step of the process. The object of coring the fruit is to remove all or most of the seeds and to cut each wedge-shaped fruit-section along its thin edge, thus removing the enveloping membrane from along said edge and detaching the section from the core.

After coring, the fruit is conveyed to hand-workers who remove the previously detached core, and separate the sections one from another, being careful to strip off and discard all of the bitter enveloping membranes, which have not yet been removed from the flat sides of said sections. The fruit-sections, thus prepared, are free from peel, seeds and bitter membrane, and are now ready to be packed into cans or other suitable receptacles, which then may be "exhausted," sealed, "processed" and cooled by whatever methods are found to produce the best results.

It will be seen from the foregoing that the process described is one especially adapted for preparing grapefruit for canning, although it will be obvious that it may also be applied to other fruits of like nature and physical characteristics.

As the particular steps of this improved process may be varied greatly without departing from the scope thereof, and as certain of these steps may be omitted without departing from the spirit of this invention, it is intended that all matter contained in the above description shall be interpreted as illustrative and not in a limiting sense.

Having thus described the present invention, what is claimed as new and is desired to secure by Letters Patent is:—

1. The process for preparing peeled grapefruit for canning which comprises, disintegrating the circumferential portion of the membrane that envelops the fruit-sections by means of a hot lye solution, and washing and cooling the fruit to or below a predetermined maximum temperature.

2. The process for preparing peeled grapefruit for canning which consists in treating the peeled fruit with a hot lye solution for the removal of adhering pith and membrane from the fruit mass.

3. The process for preparing peeled grapefruit for canning which comprises disintegrating the inner peel by means of a lye solution, and washing the lye treated fruit.

4. The process for preparing grape-fruit for canning which comprises, treating the peeled fruit with a hot lye solution, and washing and cooling the fruit.

5. The process for preparing grape-fruit for canning which comprises, treating the peeled fruit with a hot lye solution, washing and cooling the fruit, cutting the thin edges of the fruit-sections around the core while retaining said core in normal position within the fruit, and finally removing the core and separating the fruit-sections.

6. A process for preparing citrus fruit for canning which consists first in scalding the fruit and subsequently stripping the whole peel from the ball of fruit and then subjecting the latter successively to a solution of alkali and wash water.

7. A process for preparing citrus fruit for canning which consists in first scalding the fruit, then stripping the whole peel from the ball of fruit, next subjecting the ball of fruit to an alkali solution and finally opening the ball of fruit to separate the individual segments or hearts for insertion into cans.

8. A process for preparing citrus fruit for canning which consists in preliminarily removing the peel by stripping it from the ball of fruit and subsequently flowing a caustic solution without pressure over the ball of fruit preliminary to opening the latter.

9. A process for preparing citrus fruit for canning which consists preliminarily in removing the peel by stripping it from the ball of fruit, and subsequently subjecting the ball of fruit successively to a substantially pressureless flow of alkali and wash water.

In witness whereof, we have signed our names to this specification.

EUGENE HENRY LEFEVRE.
SETH STETSON WALKER.